US009913125B1

(12) United States Patent
Chen et al.

(10) Patent No.: US 9,913,125 B1
(45) Date of Patent: Mar. 6, 2018

(54) MOBILE DATA SERVICE CONTROL FOR A WIRELESS COMMUNICATION DEVICE

(71) Applicant: Sprint Communications Company L.P., Overland Park, KS (US)

(72) Inventors: Bonnie Chen, Grapevine, TX (US); Rajil Malhotra, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 573 days.

(21) Appl. No.: 14/274,915

(22) Filed: May 12, 2014

(51) Int. Cl.
    H04W 8/04    (2009.01)
    H04W 76/02   (2009.01)
    H04W 48/20   (2009.01)

(52) U.S. Cl.
    CPC .......... *H04W 8/04* (2013.01); *H04W 48/20* (2013.01); *H04W 76/02* (2013.01)

(58) Field of Classification Search
    None
    See application file for complete search history.

(56) References Cited

U.S. PATENT DOCUMENTS

| 2010/0195493 | A1* | 8/2010 | Hedman | H04L 63/1458 370/230 |
| 2010/0312897 | A1* | 12/2010 | Allen | H04L 12/1822 709/227 |
| 2011/0274045 | A1* | 11/2011 | Wu | H04L 65/1073 370/328 |
| 2012/0207070 | A1 | 8/2012 | Xu et al. | |
| 2012/0302223 | A1 | 11/2012 | Austin et al. | |
| 2013/0083702 | A1 | 4/2013 | Barany et al. | |
| 2013/0194976 | A1* | 8/2013 | Choi | H04L 12/66 370/259 |
| 2014/0162676 | A1* | 6/2014 | Shaw | H04W 76/00 455/452.2 |
| 2014/0241321 | A1* | 8/2014 | Wong | H04W 36/0022 370/331 |
| 2015/0106454 | A1* | 4/2015 | Lim | H04W 8/02 709/206 |

* cited by examiner

*Primary Examiner* — Yemane Mesfin
*Assistant Examiner* — Peter Chen

(57) ABSTRACT

A Long Term Evolution (LTE) network receives a registration request from User Equipment (UE) and responsively identifies a mobile data Access Point Name (APN) and an Internet Multimedia Subsystem (IMS) APN for the UE. The LTE network establishes a mobile data bearer and an IMS bearer responsive to APNs. The LTE network receives a user instruction to disable the mobile data service for the UE and responsively releases the mobile data bearer and disables the mobile data APN for the UE. An IMS server system exchanges messages with the UE over the IMS bearer when the mobile data service is disabled. The LTE network receives a user instruction to enable the mobile data service for the UE and responsively enables the mobile data APN for the UE.

12 Claims, 9 Drawing Sheets

MOBILE DATA SERVICE CONTROL FOR A WIRELESS COMMUNICATION DEVICE

TECHNICAL BACKGROUND

Long Term Evolution (LTE) wireless communication networks exchange wireless data with User Equipment (UE) to provide mobile data services to users. When a UE registers with the LTE network on behalf of a user, the LTE network queries a Home Subscriber System (HSS) database to obtain information related to communication services for the UE. In particular, the HSS yields Access Point Names (APNs) that initiate default bearers for the communication services. The APNs initiate communication services, such as Internet access, Voice over LTE, user provisioning, live video streaming, and the like. In some cases, the user provisioning service allows for user control based on the Extensible Mark-up Language Configuration Access Protocol (XCAP).

The HSS is used to block the communication services by disabling the APN for a blocked service. If a user fails to pay for past network usage, then the APNs for non-emergency services such as Internet browsing, are typically disabled in the HSS for that user's UE. When the UE subsequently registers with the LTE network or visits another network, the HSS does not yield any APNs that would initiate a blocked service.

In some wireless communication networks, the user's wireless device has control settings for mobile data services. For example, a user can operate their device to turn off mobile data services while retaining voice calling services. In particular, the user may specify a device setting to disable mobile data when roaming. Unfortunately, the ability of the user to control mobile data services in LTE networks is not efficient or effective.

Overview

A Long Term Evolution (LTE) network receives a registration request from User Equipment (UE) for a user and accesses a data structure to identify a mobile data Access Point Name (APN) and an Internet Multimedia Subsystem (IMS) APN for the user. The data structure may reside in a Home Subscriber System (HSS). The LTE network establishes and maintains a mobile data bearer responsive to the mobile data APN. The LTE network establishes and maintains an IMS bearer responsive to the IMS APN. The LTE network receives a first user instruction to disable the mobile data service and responsively releases the mobile data bearer and modifies the data structure to disable the mobile data APN. An IMS server system exchanges messages with the UE over the IMS bearer when the mobile data service is disabled. The LTE network configured receives a second user instruction to enable the mobile data service and responsively modifies the data structure to enable the mobile data APN for the UE.

DETAILED DESCRIPTION

Figure 1:
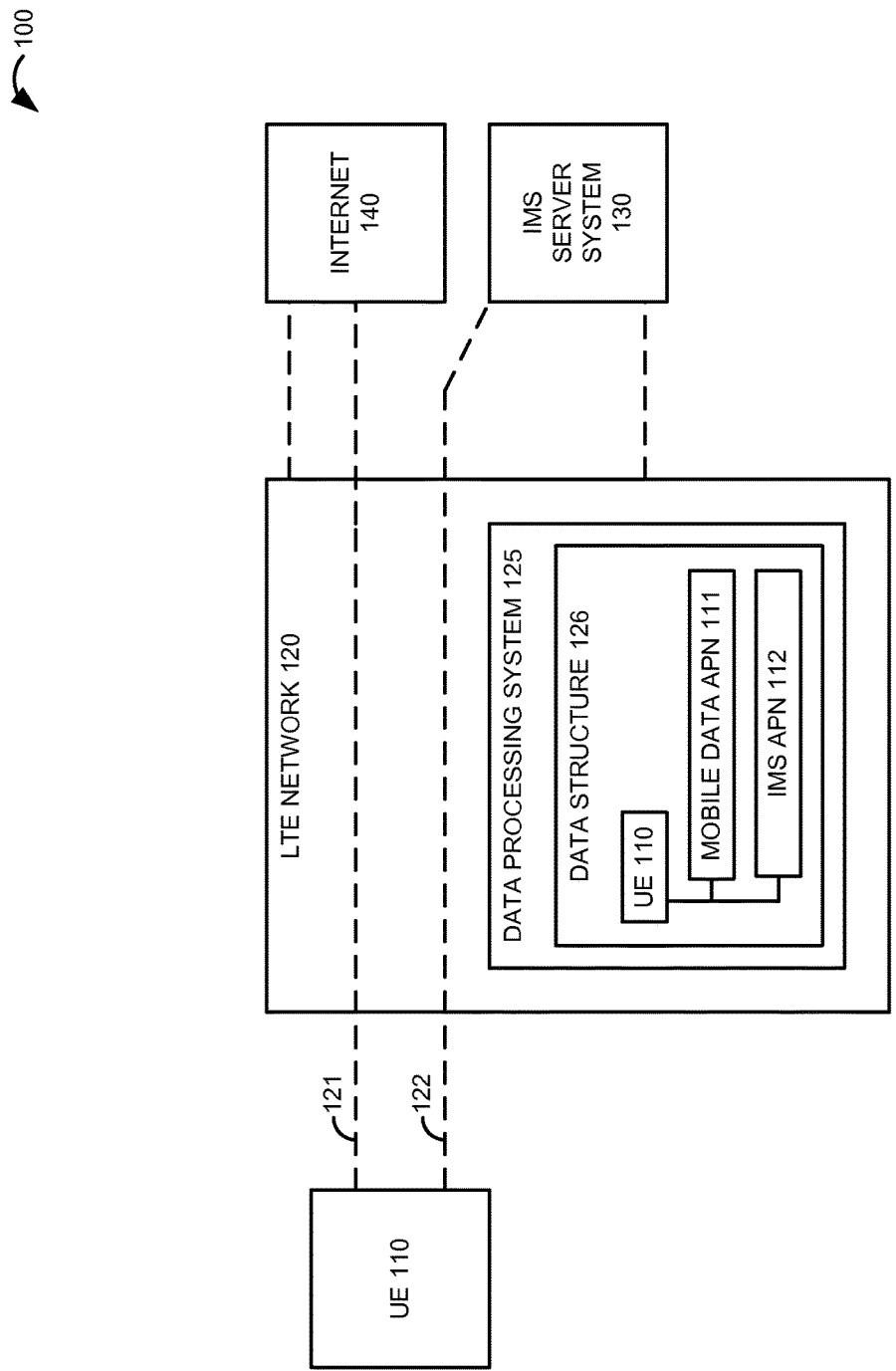
FIGS. 1-2 illustrate a communication system that controls a mobile data service for a UE.

FIG. 1 illustrates communication system 100 to control a mobile data service for User Equipment (UE) 110. A mobile data service comprises Internet-access, media streaming, file transfers, messaging, and the like. Communication system 100 comprises Long Term Evolution (LTE) network 120 and Internet Multimedia Subsystem (IMS) server system 130. LTE network 120 includes data processing system 125. Data processing system 125 maintains data structure 126 that associated UE 110 with mobile data Access Point Name (APN) 111 and IMS APN 112.

UE 110 comprises a phone, tablet, media player, computer, or some other apparatus having an LTE transceiver. LTE network 120 comprises wireless access nodes, management entities, gateways, control functions, accounting systems and/or some other LTE network elements. Data processing system 125 comprises a Home Subscriber System (HSS), Policy Charging and Rules Function (PCRF), Mobility Management Entity (MME), and/or some other LTE network elements. IMS server system 130 comprises control functions, application servers, media gateways, and/or some other IMS processing components. Internet 140 represents the Internet, another Internet Protocol (IP) network, or some other communication network—including combinations thereof.

When LTE network 120 receives a registration request from UE 110, LTE network accesses data structure 126 in data processing system 125. During this access, LTE network 120 identifies mobile data APN 111 and IMS APN 112 for UE 110. In response to mobile data APN 111, LTE network 120 establishes and maintains mobile data bearer 121 between UE 110 and Internet 140 (although bearer 121 may not extend fully to Internet 140 as shown). In response to IMS APN 112, LTE network 120 establishes and maintains IMS bearer 122 between UE 110 and IMS server system 130.

UE 110 interacts with its user to receive the instructions to disable and enable the mobile data service. UE 110 transfers the user instructions to LTE network 120. This transfer could occur over a new user provisioning bearer that uses the Extensible Mark-up Language Configuration Access Protocol (XCAP) protocol, existing data bearer 121, IMS bearer 122, and/or some other communication links— including combinations thereof. The disabling instruction could use mobile data bearer 121.

If LTE network 120 receives a user instruction from UE 110 to disable its mobile data service, then network 120 releases mobile data bearer 121 and modifies data structure 126 to disable mobile data APN 111 for UE 110. When mobile data APN 111 is disabled for UE 110 in data structure 126, data processing system 125 will not yield an enabled mobile data APN 111. Thus, mobile data bearer 121 will not be established upon subsequent registration by UE 110. IMS server system 130 may still exchange data messages with UE 110 over IMS bearer 122. Other systems including LTE network 120 may also exchange data messages with UE 110 through IMS server system 130 and IMS bearer 122.

If LTE network 120 receives a user instruction from UE 110 to enable its disabled mobile data service, then network 120 modifies data structure 126 to enable mobile data APN 111 for UE 110. When mobile data APN 111 is enabled for UE 110 in data structure 126, data processing system 126 will yield an enabled version of mobile data APN 111.

Mobile data bearer 121 will again be established upon registration by UE 110. IMS server system 130 and other systems may exchange data messages with UE 110 over IMS bearer 122.

Figure 2:
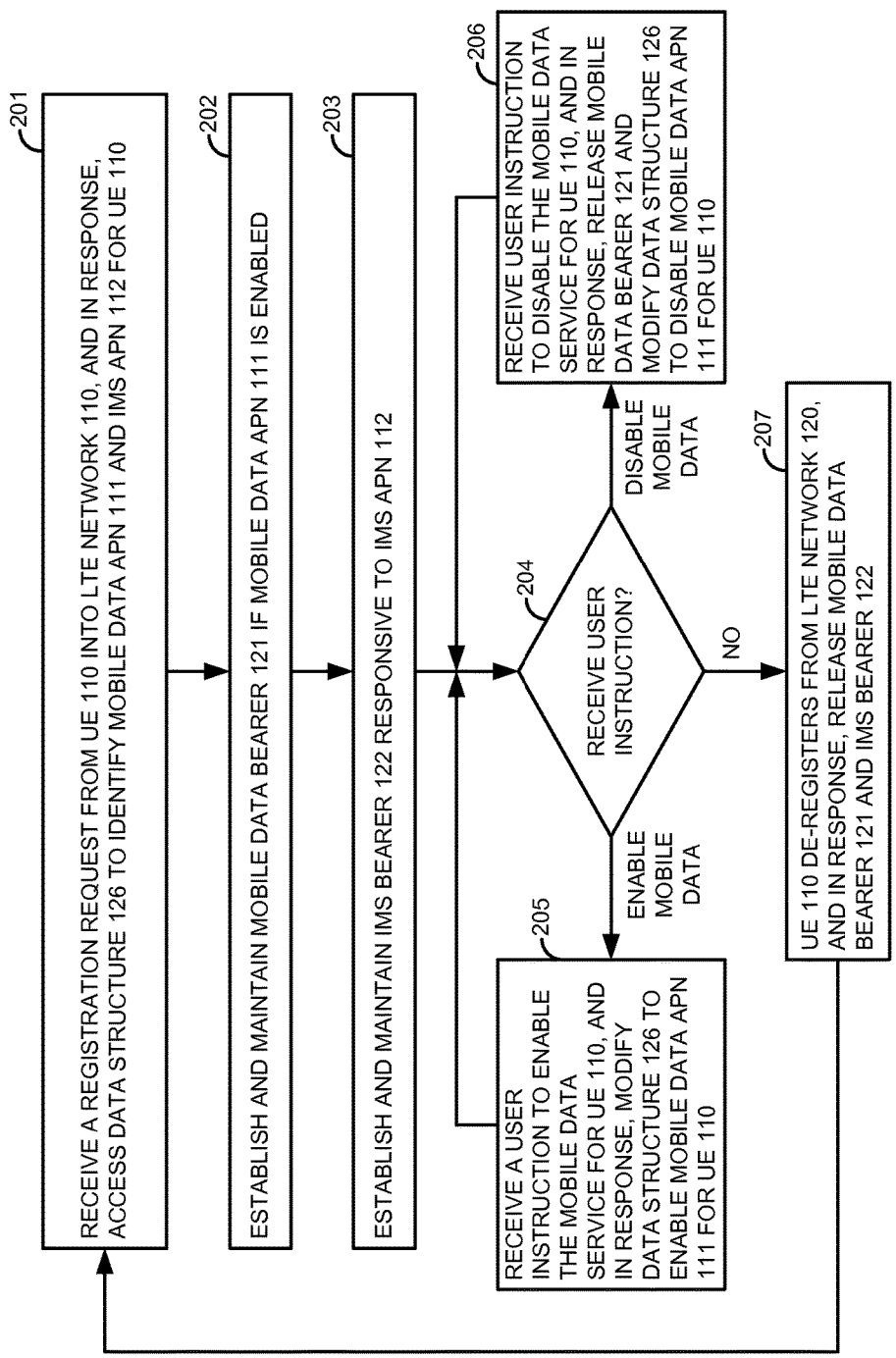

FIG. 2 illustrates the operation of communication system 100 to control the mobile data service for UE 110. LTE network 120 receives a registration request from UE 110, and responsively enters data structure 126 in data processing system 125. During this data access, LTE network 120 identifies mobile data APN 111 and IMS APN 112 for UE 110 (201). In response to mobile data APN 111, LTE network 120 establishes and maintains mobile data bearer 121 between UE 110 and Internet 140 (202). In response to IMS APN 112, LTE network 120 establishes and maintains IMS bearer 122 between UE 110 and IMS server system 130 (203).

The user operates UE 110 to transfer instructions to LTE network 120 to disable and enable the mobile data service. This transfer could occur over a user provisioning bearer that uses the Extensible Mark-up Language Configuration Access Protocol (XCAP) protocol, existing data bearer 121, IMS bearer 122, and/or some other communication links—including combinations thereof. If LTE network 120 receives a user instruction from UE 110 to disable its mobile data service (204), then network 120 releases mobile data bearer 121 and modifies data structure 126 to disable mobile data APN 111 for UE 110 (206). When mobile data APN 111 is disabled for UE 110 in data structure 126, data processing system 125 will not yield an enabled mobile data APN 111. Thus, mobile data bearer 121 will not be established upon subsequent registration by UE 110. IMS server system 130 may still exchange data messages with UE 110 over IMS bearer 122. Other systems including LTE network 120 may also exchange data messages with UE 110 through IMS server system 130 and IMS bearer 122.

If LTE network 120 receives a user instruction from UE 110 to enable its disabled mobile data service (204), then network 120 modifies data structure 126 to enable mobile data APN 111 for UE 110 (205). When mobile data APN 111 is enabled for UE 110 in data structure 126, data processing system 126 will yield an enabled version of mobile data APN 111. Mobile data bearer 121 will again be established upon registration by UE 110 and may be directly initiated by network 120 responsive to the enabling user instruction. IMS server system 130 and other systems may exchange data messages with UE 110 over IMS bearer 122.

If LTE network 120 does not receive a user instruction from UE 110 to enable or disable its disabled mobile data service (204), then UE 110 eventually de-registers from LTE network 120, and network 120 responsively releases mobile data bearer 121 and IMS bearer 122 (207). If mobile data APN 111 was disabled (206), then mobile data bearer 121 will not be established upon registration by UE 110 (201) until an enabling user instruction is received (204-205).

Figure 3:
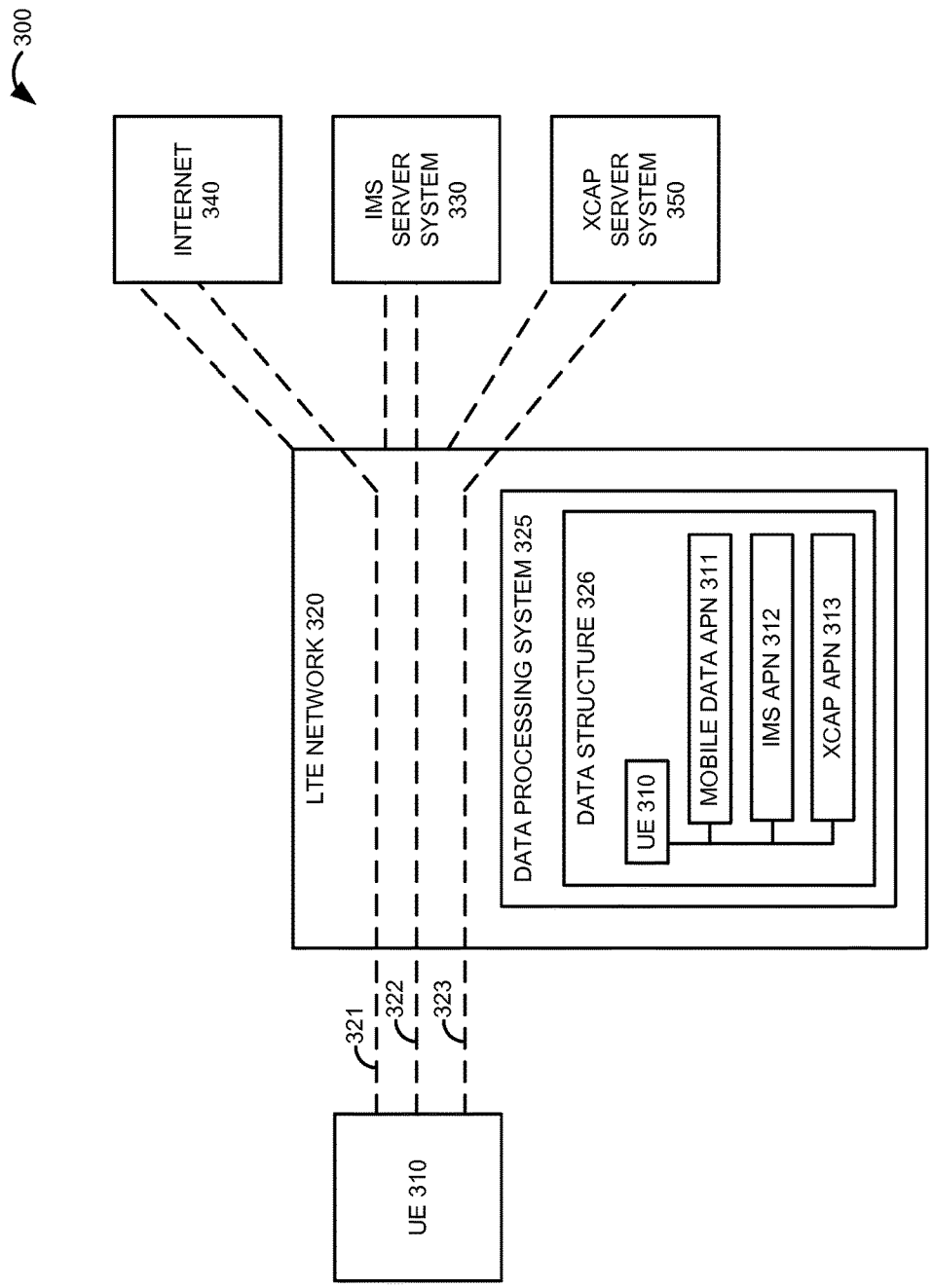
FIGS. 3-4 illustrates a communication system that controls a mobile data service for a UE over an XCAP bearer.

FIG. 3 illustrates communication system 300 to control a mobile data service for UE 310 over XCAP bearer 323. Communication system 300 comprises an example of communication system 100, although communication system 100 may be configured and operate differently than system 300. Communication system 300 comprises LTE network 320, IMS server system 330, and XCAP server system 350. LTE network 320 includes data processing system 325. Data processing system 325 maintains data structure 326 that associated UE 310 with mobile data APN 311 and IMS APN 312.

UE 310 comprises a phone, tablet, media player, computer, or some other apparatus having an LTE transceiver. LTE network 320 comprises wireless access nodes, management entities, gateways, control functions, accounting systems and/or some other LTE network elements. Data processing system 325 comprises an HSS, PCRF, MME, and/or some other LTE network elements. IMS server system 330 comprises control functions, application servers, media gateways, and/or some other IMS processing components. Internet 340 represents the Internet, another IP network, or some other communication network.

When LTE network 320 receives a registration request from UE 310, LTE network accesses data structure 326 in data processing system 325. During this access, LTE network 320 identifies mobile data APN 311, IMS APN 312, and XCAP APN 313 for UE 310. In response to mobile data APN 311, LTE network 320 establishes and maintains mobile data bearer 321 between UE 310 and Internet 340 (although bearer 321 may not extend fully to Internet 340 as shown). In response to IMS APN 312, LTE network 320 establishes and maintains IMS bearer 322 between UE 310 and IMS server system 330. In response to XCAP APN 313, LTE network 320 establishes and maintains XCAP bearer 323 between UE 310 and XCAP server system 350.

UE 310 interacts with its user to receive the instructions to disable and enable the mobile data service. UE 310 transfers the user instructions to LTE network 320 over XCAP bearer 323. If LTE network 320 receives a user instruction from UE 310 over XCAP bearer 323 and server system 350 to disable its mobile data service, then network 320 releases mobile data bearer 321 and modifies data structure 326 to disable mobile data APN 311 for UE 310. When mobile data APN 311 is disabled for UE 310 in data structure 326, data processing system 325 will not yield an enabled mobile data APN 311. Thus, mobile data bearer 321 will not be established upon subsequent registration by UE 310. IMS server system 330 may still exchange data messages with UE 310 over IMS bearer 322. Other systems including LTE network 320 may also exchange data messages with UE 310 through IMS server system 330 and IMS bearer 322. XCAP server system 350 may still exchange data messages with UE 310 over XCAP bearer 323. Other systems including LTE network 320 may also exchange data messages with UE 310 through XCAP server system 350 and XCAP bearer 323.

If LTE network 320 receives a user instruction from UE 310 over XCAP bearer 323 and server system 350 to enable its disabled mobile data service, then network 320 modifies data structure 326 to enable mobile data APN 311 for UE 310. When mobile data APN 311 is enabled for UE 310 in data structure 326, data processing system 326 will yield an enabled version of mobile data APN 311. Mobile data bearer 321 will again be established upon registration by UE 310 and may be directly initiated by network 320 responsive to the enabling user instruction. IMS server system 330 and other systems may exchange data messages with UE 310 over IMS bearer 322.

Figure 4:
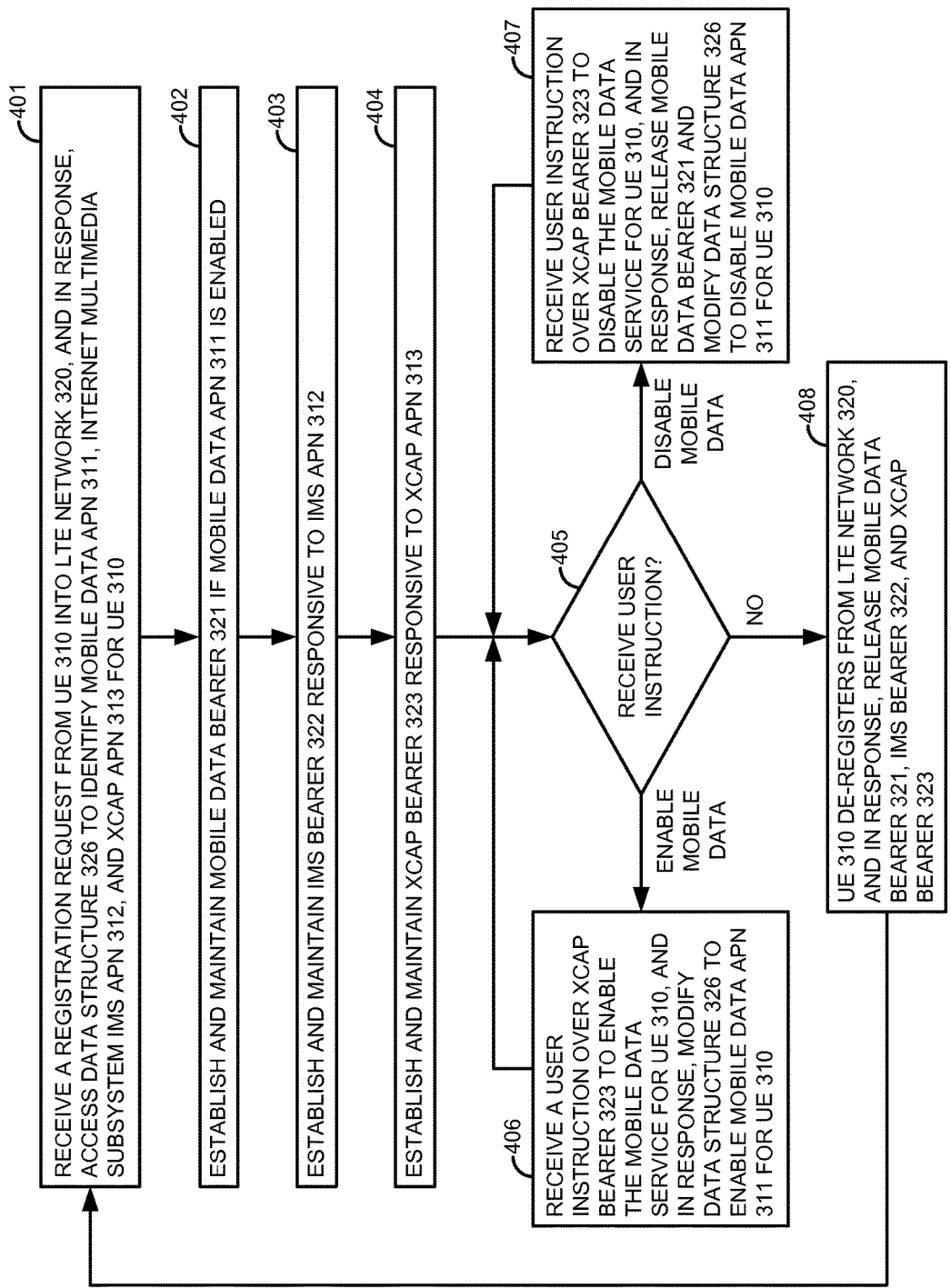

FIG. 4 illustrates the operation of communication system 300 to control the mobile data service for UE 310 over XCAP bearer 323. LTE network 320 receives a registration request from UE 310, and responsively enters data structure 326 in data processing system 325. During this data access, LTE network 320 identifies mobile data APN 311, IMS APN 312, and XCAP APN 313 for UE 310 (401). In response to mobile data APN 311, LTE network 320 establishes and maintains mobile data bearer 321 between UE 310 and Internet 340 (402). In response to IMS APN 312, LTE network 320 establishes and maintains IMS bearer 322 between UE 310 and IMS server system 330 (403). In response to XCAP APN 313, LTE network 320 establishes and maintains XCAP bearer 323 between UE 310 and XCAP server system 350 (404).

The user operates UE 310 to transfer instructions to LTE network 320 over XCAP bearer 323 and server system 350 to disable and enable their mobile data service. If LTE network 320 receives a user instruction from UE 310 to disable its mobile data service (405), then network 320 releases mobile data bearer 321 and modifies data structure 326 to disable mobile data APN 311 for UE 310 (407). When mobile data APN 311 is disabled for UE 310 in data structure 326, data processing system 325 will not yield an enabled mobile data APN 311. Thus, mobile data bearer 321 will not be established upon subsequent registration by UE 310. IMS server system 330 may still exchange data messages with UE 310 over IMS bearer 322. Other systems including LTE network 320 may also exchange data messages with UE 310 through IMS server system 330 and IMS bearer 322. XCAP server system 350 may still exchange data messages with UE 310 over XCAP bearer 323. Other systems including LTE network 320 may also exchange data messages with UE 310 through XCAP server system 350 and XCAP bearer 323.

If LTE network 320 receives a user instruction from UE 310 over XCAP bearer 323 and server system 350 to enable its disabled mobile data service (405), then network 320 modifies data structure 326 to enable mobile data APN 311 for UE 310 (406). When mobile data APN 311 is enabled for UE 310 in data structure 326, data processing system 326 will yield an enabled version of mobile data APN 311. Mobile data bearer 321 will again be established upon registration by UE 310 and may be directly initiated by network 320 responsive to the enabling user instruction.

If LTE network 320 does not receive a user instruction from UE 310 to enable or disable its disabled mobile data service (405), then UE 310 eventually de-registers from LTE network 320, and network 320 responsively releases mobile data bearer 321, IMS bearer 322, and XCAP bearer 323 (408). If mobile data APN 311 was disabled (407), then mobile data bearer 321 will not be established upon registration by UE 310 (401) until an enabling user instruction is received (405-406).

Figure 5:
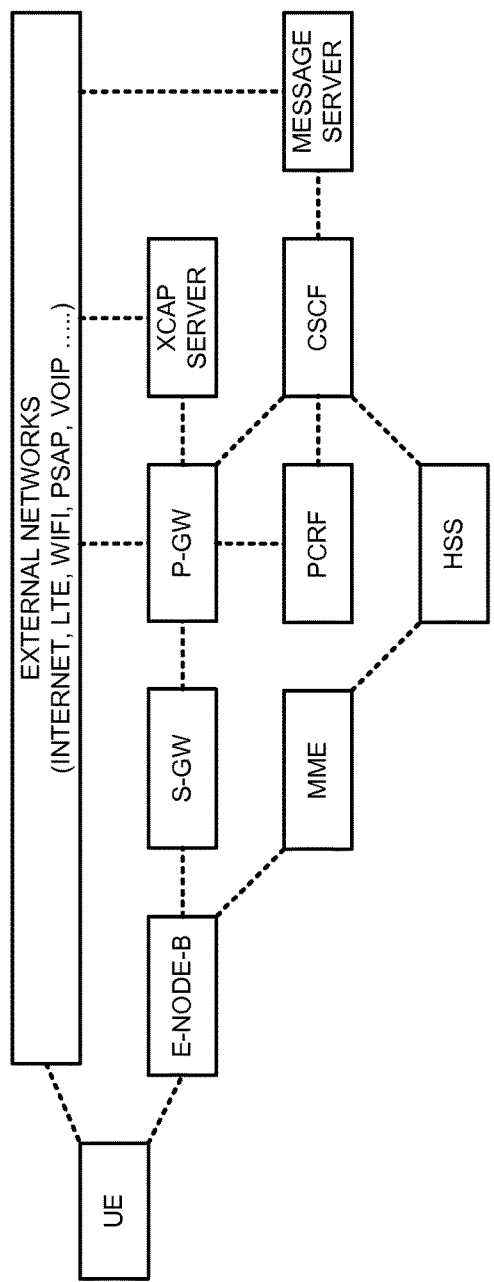
FIGS. 5-8 illustrates the operation of the communication system to control mobile data services for the UE over the XCAP bearer.

FIG. 5 illustrates communication system 500 to control mobile data services for LTE UEs. Communication system 500 is an example of communication system 100, although system 100 may use alternative configurations and operations. Communication system 500 comprises the following LTE network elements: eNodeB, Service Gateway (S-GW), Packet Data Network Gateway (P-GW), XCAP server, Mobility Management Entity (MME), Policy Charging and Rules Function (PCRF), and Home Subscriber System (HSS). Communication system 500 comprises the following IMS network elements: Call Session Control Functions (CSCF) and message server.

In communication system 500, the UE transfers mobile data instructions from the user through various systems to the MME. The MME then enables and disables the associated mobile data APNs in the HSS. Various messaging paths can be maintained to the UE while the mobile data service is disabled.

Figure 6:
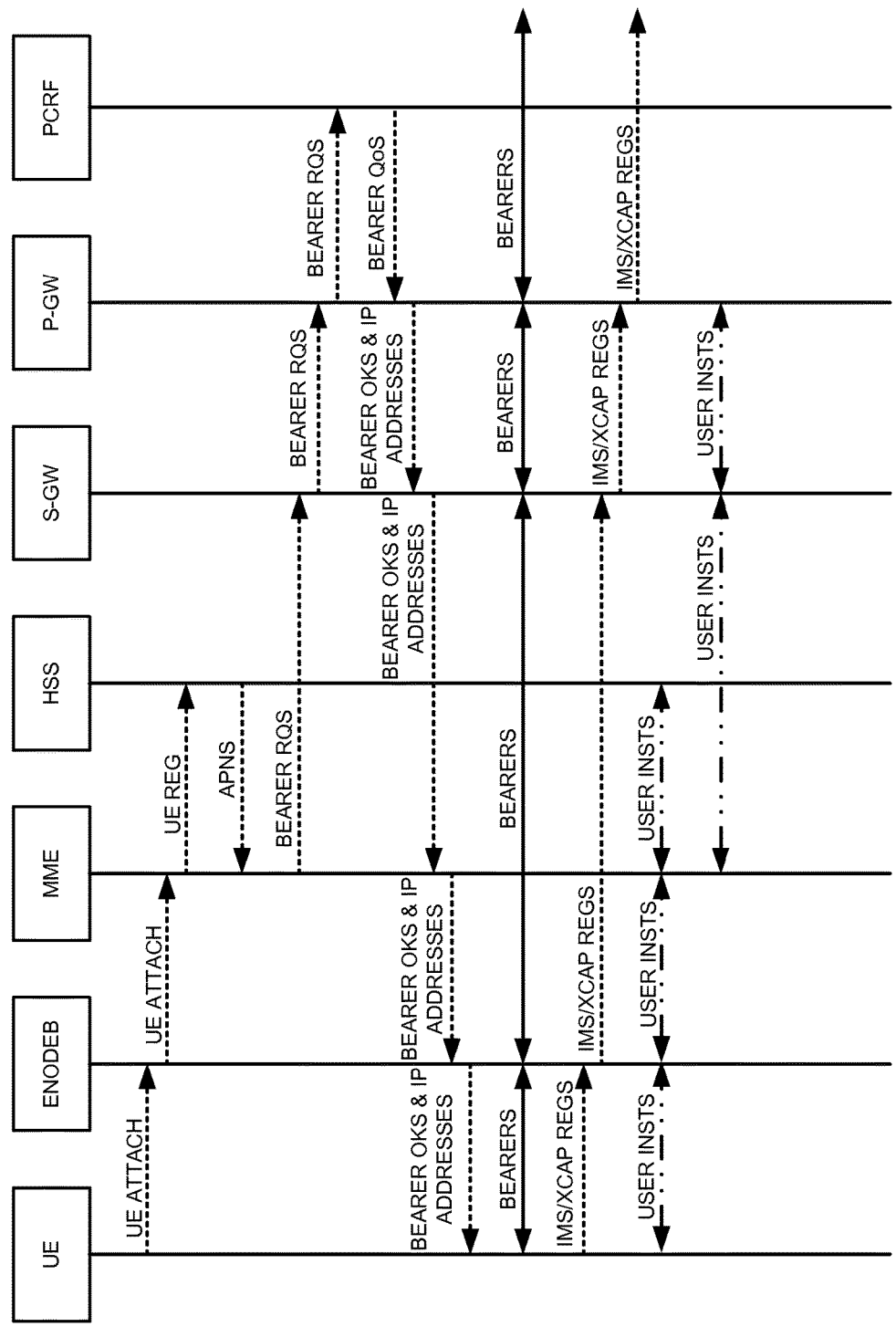

FIG. 6 illustrates the operation of communication system 500 to control mobile data services for LTE UEs. The UE wirelessly attaches to the eNodeB. The eNodeB transfers an attachment message for the UE to the MME. The MME transfers an LTE registration for the UE to the HSS. The HSS processes the LTE registration and returns Access Point Names (APNs) for various services including mobile Internet, mobile video, IMS, and XCAP.

In response to the APNs, the MME transfers bearer requests to the S-GW. The S-GW transfers the bearer requests to the P-GW. The P-GW interacts with the PCRF to obtain QoS and other control parameters for the default bearers. The P-GW selects IP addresses for the UE, P-GW, CSCF, XCAP server, and possibly other systems like a video server. The P-GW transfers bearer OK messages to the S-GW indicating the IP addresses. The S-GW transfers bearer OK messages to the MME indicating the IP addresses. The MME transfers bearer OK messages to the UE over the eNodeB indicating the IP addresses. Bearers for the UE are established over the eNodeB, S-GW, and P-GW. The UE transfers an IMS registration and an XCAP registration over the respective IMS and XCAP bearers. A default video bearer and registration may be established in a similar manner.

The user may operate the UE to specify instructions to disable or enable the mobile Internet service and the mobile video service. The UE may transfer these instructions for implementation by the MME and HSS over the eNodeB or another path through the P-GW and/or the S-GW to the MME.

Figure 7:
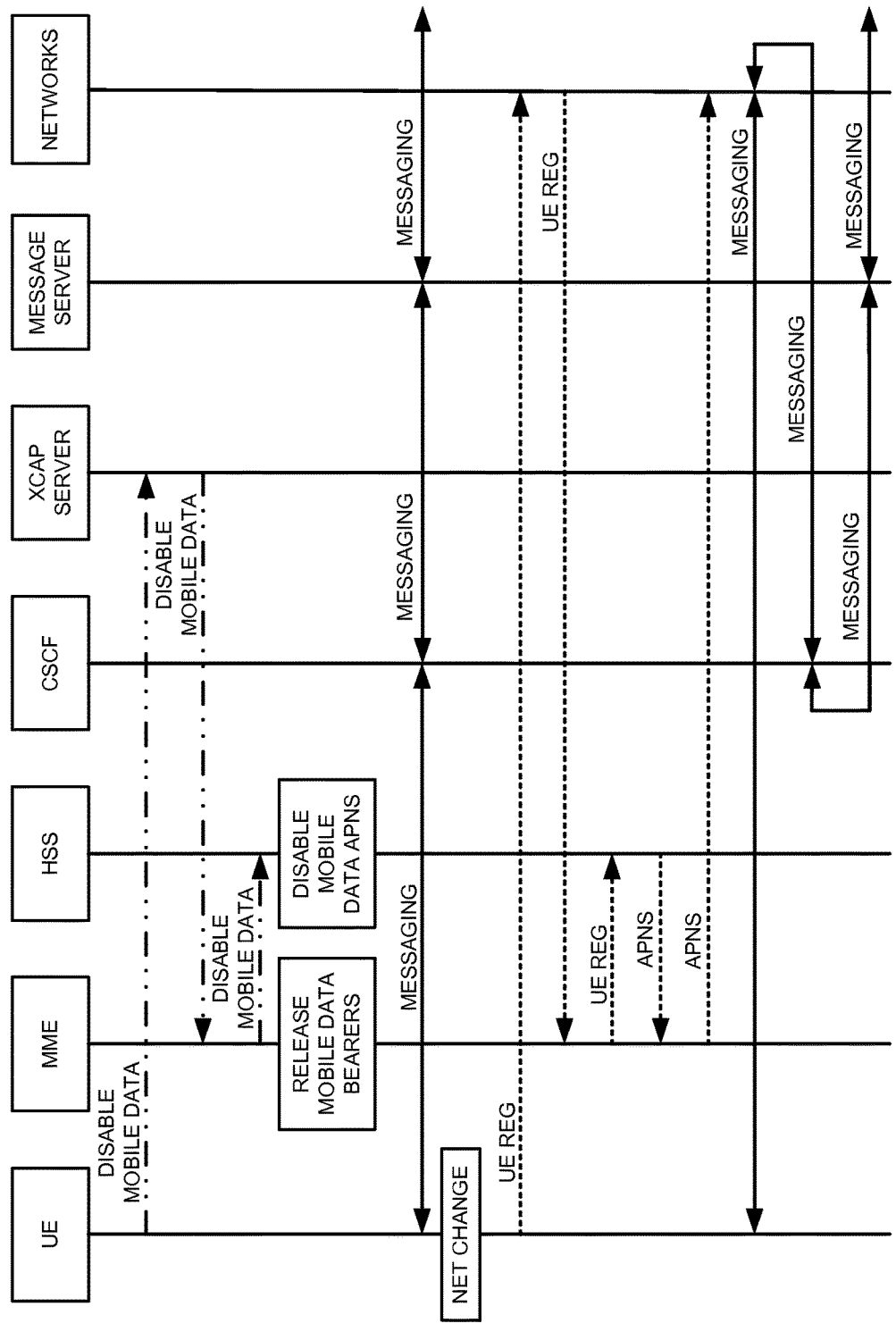

FIG. 7 illustrates the operation of communication system 500 to control mobile data services for LTE UEs. The UE transfers a user instruction to disable the mobile Internet service and the mobile video service to the MME through the XCAP server—where it may be interworked. The MME transfers a version of the user instruction to disable the mobile Internet service and the mobile video service to the HSS. The MME releases the internet and video bearers (with instructions to the eNodeB and S-GW). The HSS disables the Internet APN and the video APN. Without these mobile data services, the UE may still exchange data messages with other systems over the LTE network (IMS bearer), CSCF, and message server.

Eventually, the UE changes to another network and registers with the new network. The new network contacts the MME for service authorizations for the UE. For example, the UE may roam onto another network that then requests roaming service authorization from the home LTE network. The MME access the HSS to retrieve the enabled APNs for IMS and XCAP but not the disabled APNs for Internet and video. The MME transfer authorizations for the enabled APNs to the roaming network which then establishes appropriate bearers to XCAP and IMS systems. Internet and video bearers for the UE are blocked in the roaming network upon user request. Without these mobile data services, the UE may still exchange data messages with other systems over the roaming network (IMS bearer), CSCF, and message server.

In some examples, the user disabling instruction comprises a device setting in combination with a roaming network's service authorization. In these examples, the user's device setting is receiving in a similar manner to the user instructions described herein. The MME also receives service authorizations from the visited or roaming networks as described herein. The MME disables the mobile data service in response to receiving both: 1) a user device setting to disable a mobile data service when roaming, and 2) a service authorization from the visited or roaming network. Thus, the MME disables the mobile data APN in the HSS (and releases any remaining mobile data bearers) in response to a roaming service authorization if the current user device setting is to disable mobile data when roaming.

In some examples, the user enabling instruction comprises a device setting in combination with a home network's service authorization. In these examples, the user's device setting is receiving in a similar manner to the user instructions described herein. The MME also receives service authorizations (LTE attachments and registrations) from the home network as described herein. The MME enables the mobile data service in response to receiving both: 1) a user device setting to disable a mobile data service when roaming, and 2) a service authorization from the home network. Thus, the MME enables the mobile data APN in the HSS in response to a home service authorization if the current user device setting is to disable mobile data when roaming.

Figure 8:
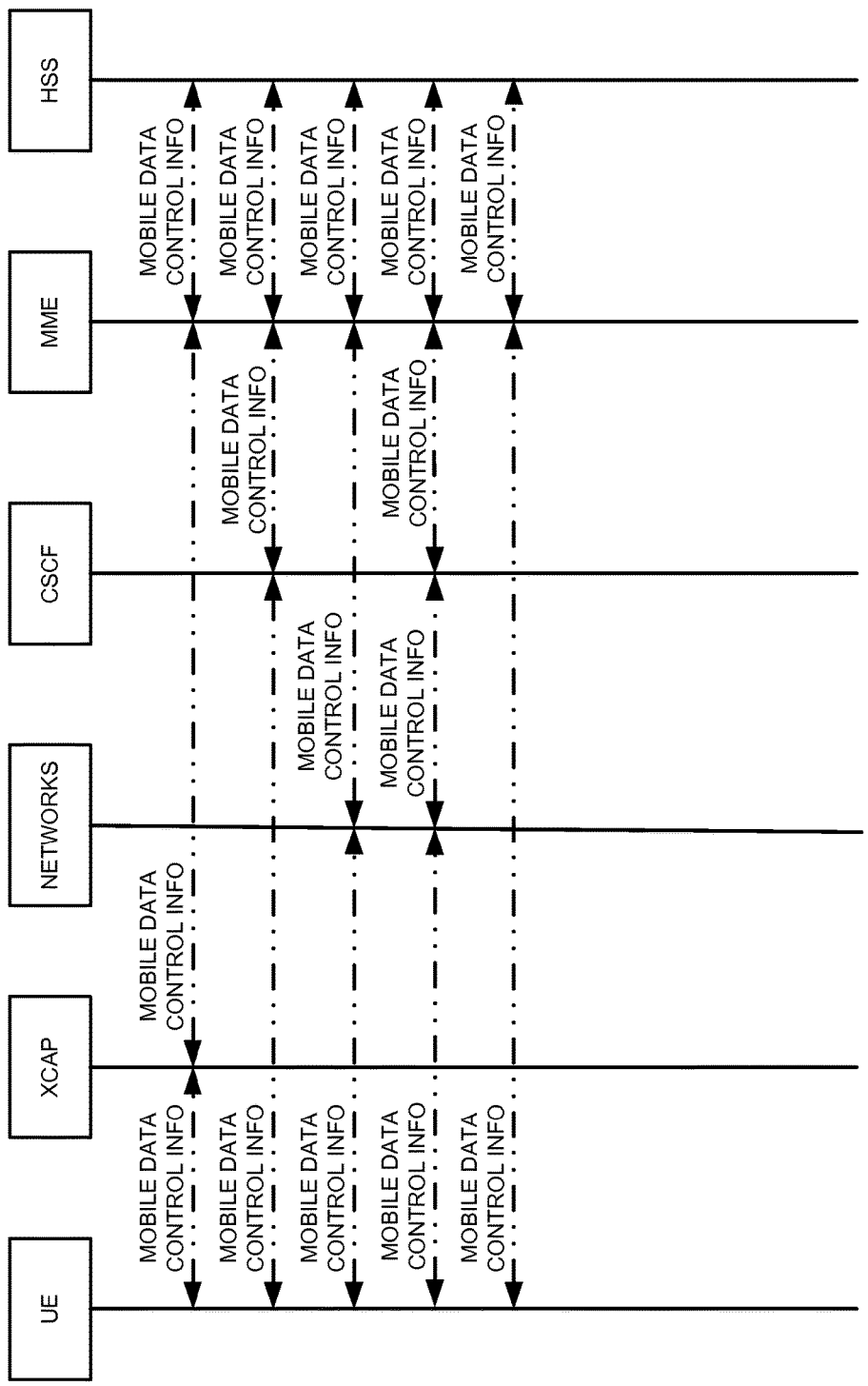

FIG. 8 illustrates the operation of communication system 500 to control mobile data services for LTE UEs. The UE and MME/HSS exchange mobile data control information with user instructions to disable and enable mobile data services while retaining a data messaging capability. The transfer of the mobile data control information may take various paths: UE-XCAP-MME-HSS, UE-CSCF-MME-HSS, UE-NETS-MME-HSS, UE-NETS-CSCF-MME-HSS, and/or UE-MME-HSS.

Figure 9:
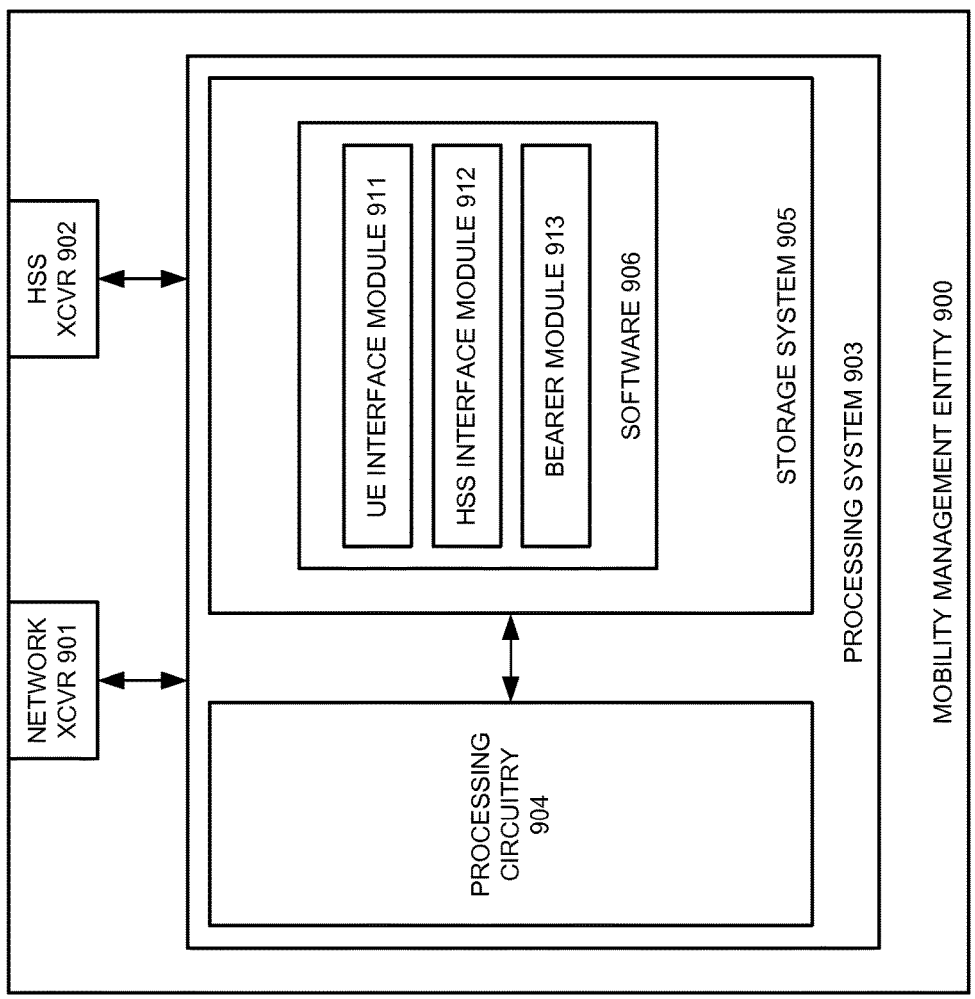
FIG. 9 illustrates a Mobility Management Entity (MME) to control mobile data services for LTE UEs.

FIG. 9 illustrates Mobility Management Entity (MME) 900 to control mobile data services for LTE UEs. MME 900 is an example of systems 120, 320, and 500, although these systems may use alternative configurations and operations. MME 900 comprises network transceiver 901, HSS transceiver 902, and processing system 903. Processing system 903 comprises processing circuitry 904 and storage system 905. Storage system 905 stores software 906. Software 906 includes software modules 911-913. Some conventional aspects of MME 900 are omitted for clarity, such as power supplies, enclosures, and the like. MME 900 may be centralized or distributed and may include various virtualized components.

Network transceiver 901 and HSS transceiver 902 comprise communication components, such as ports, signal processing circuitry, memory, software, and the like. Transceivers 901-902 may be integrated together. Network transceiver 901 exchanges signaling with eNodeBs, S-GWs, and other network elements. HSS transceiver 902 exchanges signaling with HSS systems—perhaps over a diameter interface.

In processing system 903, processing circuitry 904 comprises circuit boards, integrated circuitry, and associated electronics. Storage system 905 comprises non-transitory, machine-readable, data storage media, such as flash drives, disc drives, memory circuitry, servers, and the like. Software 906 comprises machine-readable instructions that control the operation of processing circuitry 904 when executed. Software 906 includes modules 911-913 and may also include operating systems, applications, utilities, databases, and the like. All or portions of software 906 may be externally stored on one or more storage media, such as flash drives, discs, servers, and the like.

When executed by processing circuitry 904, UE interface module 911 directs circuitry 904 to exchange mobile data control information (including user enable/disable instructions) with UEs over various systems. When executed by processing circuitry 904, HSS interface module 912 directs circuitry 904 to enable and disable mobile data APNs in HSS systems responsive to the mobile data control information. When executed by processing circuitry 904, bearer module 913 directs circuitry 904 to release and re-establish mobile data bearers within LTE systems responsive to the mobile data control information.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A communication system to control a mobile data service for User Equipment (UE), the communication system comprising:
    a Long Term Evolution (LTE) network configured to receive a registration request from the UE and responsively access an LTE network data structure to identify a mobile data Access Point Name (APN), Extensible Mark-up Language (XML) Configuration Access Protocol (XCAP) APN, and an Internet Multimedia Subsystem (IMS) APN for the UE, establish and maintain a mobile data bearer responsive to the mobile data APN, establish an XCAP bearer responsive to the XCAP APN, and establish and maintain an IMS bearer responsive to the IMS APN;
    the LTE network configured to receive a first user instruction over the XCAP bearer to disable the mobile data service for the UE and responsively release the mobile data bearer and modify the LTE network data structure to disable the mobile data APN for the UE;
    an IMS server system configured to exchange messages with the UE over the IMS bearer when the mobile data service is disabled; and
    the LTE network configured to receive a second user instruction over the XCAP bearer to enable the mobile data service for the UE and responsively modify the LTE network data structure to enable the mobile data APN for the UE.

2. The communication system of claim 1 wherein the first user instruction comprises:
    a user setting transferred by the UE to disable the mobile data service when roaming; and
    an indication that the UE is roaming.

3. The communication system of claim 1 the second user instruction comprises:
    a user setting transferred by the UE to enable the mobile data service when not roaming; and
    an indication that the UE is not roaming.

4. The communication system of claim 1 wherein the LTE network data structure comprises a Home Subscriber System (HSS).

5. The communication system of claim 1 wherein the mobile data service comprises a mobile Internet-access service.

6. The communication system of claim 1 wherein the mobile data service comprises a mobile video streaming service.

7. A method of operating a communication system to control a mobile data service for User Equipment (UE), the method comprising:
    in a Long Term Evolution (LTE) network, receiving a registration request from the UE and responsively accessing an LTE network data structure to identify a mobile data Access Point Name (APN), Extensible Mark-up Language (XML) Configuration Access Protocol (XCAP) APN, and an Internet Multimedia Subsystem (IMS) APN for the UE;

in the LTE network, establishing and maintaining a mobile data bearer responsive to the mobile data APN, establishing and maintaining an XCAP bearer responsive to the XCAP APN, and establishing and maintaining an IMS bearer responsive to the IMS APN;

in the LTE network, receiving a first user instruction over the XCAP bearer to disable the mobile data service for the UE and responsively releasing the mobile data bearer and modifying the LTE network data structure to disable the mobile data APN for the UE;

in an IMS server system, exchanging messages with the UE over the IMS bearer when the mobile data service is disabled; and in the LTE network, receiving a second user instruction over the XCAP bearer to enable the mobile data service for the UE and responsively modifying the LTE network data structure to enable the mobile data APN for the UE.

8. The method of claim 7 wherein receiving the first user instruction comprises:

in the LTE network, receiving a user setting transferred by the UE to disable the mobile data service when roaming; and in the LTE communication network, receiving an indication that the UE is roaming.

9. The method of claim 7 wherein receiving the second user instruction comprises:

in the LTE network, receiving a user setting transferred by the UE to enable the mobile data service when not roaming; and in the LTE network, receiving an indication that the UE is not roaming.

10. The method of claim 7 wherein the LTE network data structure comprises a Home Subscriber System (HSS).

11. The method of claim 7 wherein the mobile data service comprises a mobile Internet-access service.

12. The method of claim 7 wherein the mobile data service comprises a mobile video service.

\* \* \* \* \*